Sept. 1, 1953 W. E. MARTIN 2,650,727
SWINGABLE TRAILER RAMP
Filed July 15, 1948 2 Sheets-Sheet 1
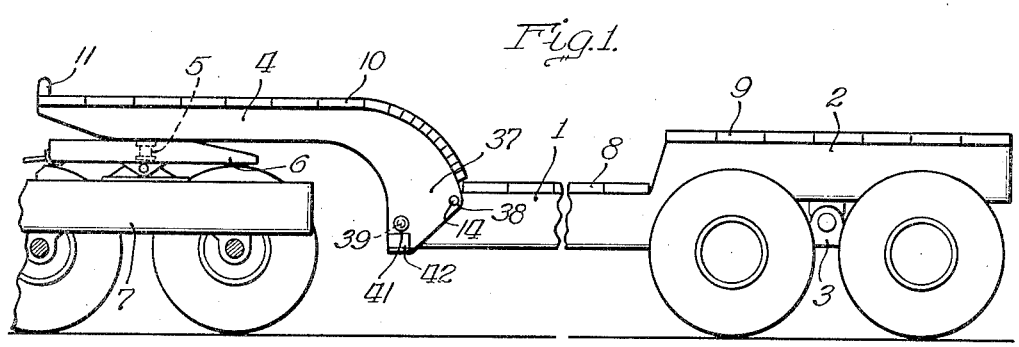
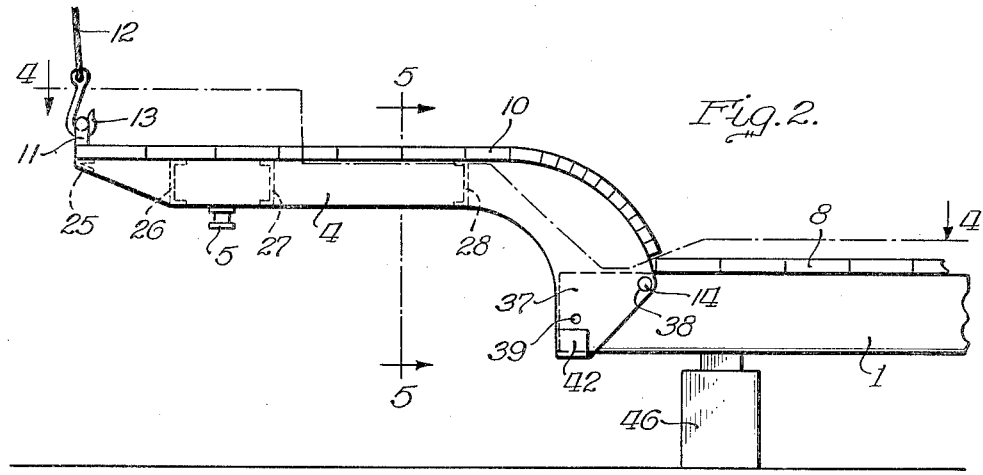
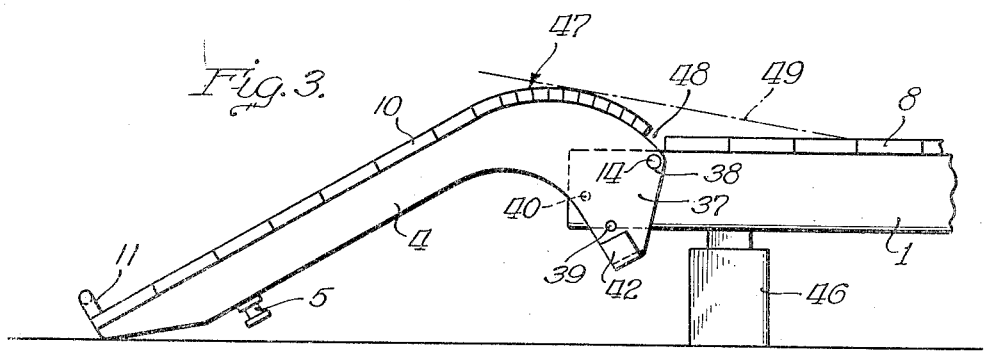
INVENTOR.
William E. Martin
BY
Eberhard E. Weltley
Atty.

Sept. 1, 1953          W. E. MARTIN          2,650,727
SWINGABLE TRAILER RAMP
Filed July 15, 1948          2 Sheets-Sheet 2
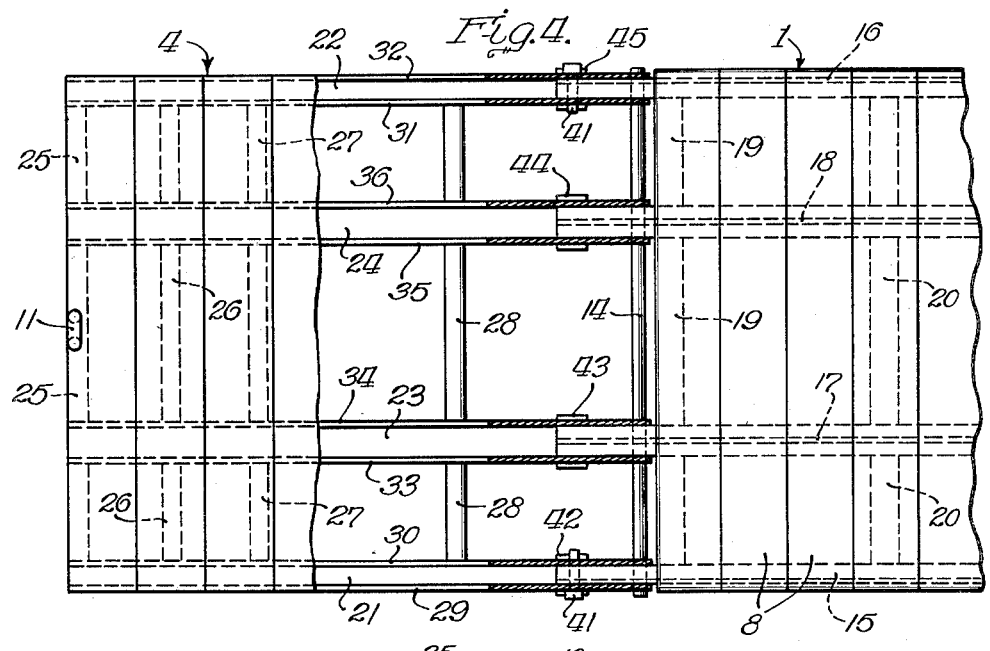
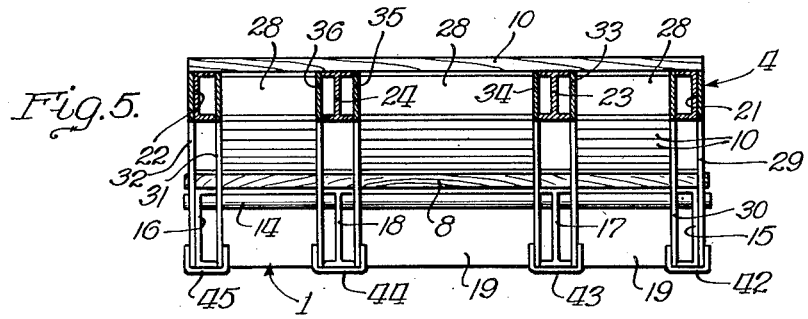
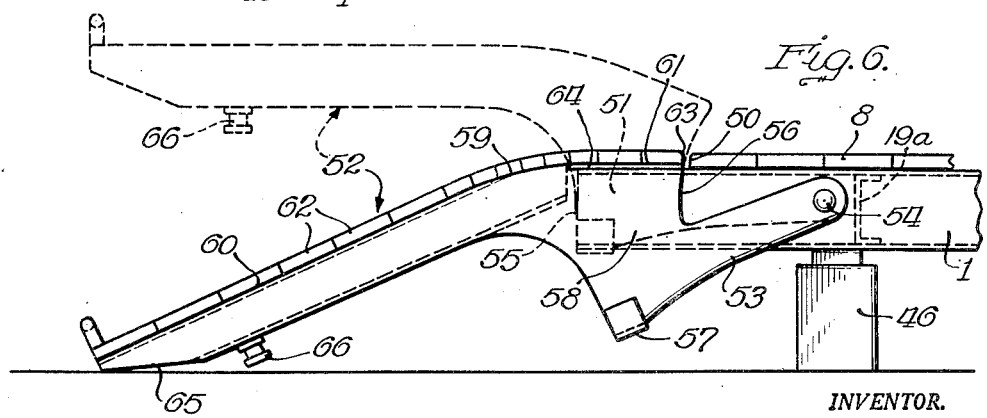
INVENTOR.
William E. Martin
BY
Eberhard E. Walley
Atty.

Patented Sept. 1, 1953

2,650,727

UNITED STATES PATENT OFFICE 2,650,727

SWINGABLE TRAILER RAMP

William E. Martin, Kewanee, Ill.

Application July 15, 1948, Serial No. 38,839

13 Claims. (Cl. 214—85)

1

This invention relates to a trailer ramp adapted for loading and unloading machinery across the forward end of a mobile machinery hauling trailer after such trailer has been disconnected from its towing vehicle and supported by blocks or other similar means to hold the trailer bed level with respect to the ground.

One of the main objects of this invention is to provide a trailer with a ramp which is connected with the trailer bed for swinging movement relatively thereto to position the ramp in one location wherein it functions as a hitch for connection with a towing vehicle, and to permit such ramp to swing into a ground engaging position wherein said ramp is disposed out of the way and to function as an inclined runway leading from the ground to the trailer bed for machinery loading purposes.

It is another object of the present invention to provide a unitary swingable member that includes hitching mechanism for towing the trailer, and which member is bodily swingable as a whole between a predetermined traveling position and a position in contact with the ground or roadway to provide a ramp for the trailer bed when in the latter position.

Another object of this invention is to provide a unitary swingable ramp that is connected with the trailer for swinging movement upon pivotal means having a single pivotal axis about which the ramp swings. With this arrangement the swingable trailer ramp and the means used for connecting the same to the trailer bed may be of inexpensive construction as well as comprising parts of simple cooperative design.

Another object of the present invention is to provide a unitary swingable ramp that operates about a single pivot and which is also made to furnish a full trailer width ramp for the end of the trailer bed so that the loading or unloading runway to and from the bed is the same width of the trailer bed.

Another advantage in the swingable trailer ramp of the present design is that the forward free end thereof does not need additional roadway clearance when it is dropped to the ground or when it is raised by means of a winch or other lift means. In other words, the position of the outer transverse end of the ramp when raised is substantially in the same vertical plane as this end thereof occupies when the ramp rests upon the ground. The arc through which the forward free end of the ramp swings requires little additional clearance so that the winch carrying vehicle or tractor can be held closely to the trailer

2 when lowering the ramp or raising the same. Furthermore, the loading ramp space ahead of the bed is held to a minimum by the swingable one piece ramp which remains close up in carrying out the functions for which it was designed.

It is still a further object of the ramp hitch structure of this invention to provide a bodily swingable unit that is pivoted about fulcrum means located remotely from the adjacent ramp carrying end of the trailer bed to thereby change the surface contour of the ramp to establish a runway that blends into the surface of the trailer bed runway and to thus eliminate having any portion of the ramp occupying an elevation above the general elevation of the loading plane of the trailer bed.

All other objects and advantages relating to the present trailer ramp design shall hereinafter appear in the following detailed description having reference to the accompanying drawings forming a part of this specification.

In the drawings:

Fig. 1 is a side elevational view of a trailer incorporating the ramp construction of the present invention and illustrating the trailer and its ramp as connected with a towing vehicle or tractor and in traveling position;

Fig. 2 is a fragmentary side elevational view of the forward end of the trailer as it would appear when disconnected from its towing vehicle with the adjacent end of the trailer bed propped up and with the free end of the trailer ramp supported by a winch cable and hook;

Fig. 3 is a reproduction of Fig. 2 but showing the position of the ramp as down and with the free end thereof in ground contacting position;

Fig. 4 is a plan view of the fragmentary portion of the trailer illustrated in Fig. 2 and as seen with the ramp in raised position as in Fig. 2, certain parts of the ramp being in section to indicate those parts of the ramp and trailer as viewed substantially along the plane of the line 4—4 in Fig. 2;

Fig. 5 is a vertical cross sectional view of the ramp taken on a transverse plane and substantially as seen along the plane of the line 5—5 in Fig. 2; and Fig. 6 is a fragmentary side elevational view of the front end of a trailer embodying a ramp of modified construction in combination therewith.

Referring to Fig. 1, the trailer consists of a machinery hauling bed 1 having an upwardly offset rear platform 2 suitably supported upon a wheeled carriage 3, and the forward end of the trailer bed is provided with a ramp 4 having a hitch pin 5 that is operatively connected with the fifth wheel 6 of a tractor 7 or other towing vehicle. Planking 8 and 9 is used to provide a supporting covering or floor for the bed 1 and for the platform 2, and the ramp 4 is also covered by planking such as 10 to provide a runway for machinery toward or away from bed 1 when the ramp is used as in Fig. 3. The forward free end of the ramp 4 is further provided with a hook eye 11 for the reception of suitable lift means such as the winch cable 12 and hook 13 of a winch for purposes of raising and lowering the ramp 4.

The entire ramp 4 is bodily pivoted as a unit upon a shaft 14 carried by the front end of the bed 1 so that the ramp is bodily swingable with respect to the forward end of the bed 1 and from transportable hitch position as seen in Fig. 1 to ground contacting position in Fig. 3 to function in the capacity of a machinery loading runway, or vice versa as the case may be.

The actual construction of the trailer and the ramp may be varied in many respects. Figs. 4 and 5 illustrate a preferred arrangement of the detail parts of the trailer and ramp. The trailer bed 1 is shown as a framework comprising longitudinal side channels 15 and 16 with intermediate I-beams 17 and 18 spaced therebetween, all these members being joined by suitably spaced transverse beams 19—19 and 20—20, etc. Flooring 8 covers this frame structure of the bed. The channels 15 and 16, and the beams 17 and 18 extend forwardly and outwardly with respect to machinery carrying portion of the bed 1 which substantially ends at the transverse beams 19 and with the flooring 8 as best seen in the plan view in Fig. 4. The shaft 14 is connected and supported on the extended portion of the bed framework and in the position best shown in Figs. 4 and 5.

The ramp 4 is also a framework consisting of longitudinal side channels 21 and 22 with intermediate I-beams 23 and 24, such channels being suitably spaced and firmly connected by transverse beams 25, 26, 27 and 28. Flooring 10 covers this framework and provides the runway for the machinery to be loaded or unloaded from the trailer.

Ramp 4 and its framework also carries a plurality of baffles forming side plates which are secured into the framework of the ramp and compose a part thereof. The baffles are all alike, and baffles 29 and 30 flank channel 21, baffles 31 and 32 flank channel 22, baffles 33 and 34 flank beam 23, while baffles 35 and 36 flank beam 24. The baffles collectively occupy the same positions laterally across the ramp and its framework, and each baffle terminates with a rearward and downward extension 37 having an opening 38 for pivotal connection with shaft 14. Each baffle also has an aperture 39 adapted for alignment with similar openings 40 in the trailer frame parts when the ramp is raised to accommodate pins 41, if desired, to lock the ramp and bed together in raised position as seen in Figs. 1 and 4, thus supporting the ramp when necessary and when not connected in towing relation.

As best seen in Figs. 4 and 5, each pair of beam flanking baffles 29—30, 31—32, etc., of the ramp terminate in predetermined positions substantially even with the bottom of the projecting framework of the trailer bed 1 when such ramp 4 is disposed in raised position as shown in Figs. 1 and 2. The pairs of baffles 29—30, 31—32, etc., each carry saddles 42, 43, 44 and 45 respectively at their lower terminal ends, each of these saddles comprising abutment means to engage under the corresponding projecting beams of the trailer bed 1. The saddles 42 to 45 act to limit the upward swinging movement of the ramp 4 with respect to the trailer bed 1 and by reason of their engagement underneath the bed beams 15, 16, 17 and 18, serve to support the forward end of the trailer bed to carry the load while the ramp is in traveling position upon the fifth wheel 6 of the tractor 7 in Fig. 1. Although the lock pins 41 are shown in Fig. 1 it is to be understood that they do not serve the purpose of carrying the trailer load. They may be designed to partially carry the load if necessary or desired but are primarily for keeping the ramp in raised position during unhitching or hitching, or while the trailer is at rest. The main load of the trailer is carried by the ramp through the saddles 42 to 45, and by the baffles and ramp framework.

Thus, through the action of the pivotal shaft 14 and the saddles 42 to 45, upward force upon the outer end of the ramp 4 brings such saddles into contact with the lower surfaces of the bed beams 15 to 18 inclusive, limiting relative movement of the ramp 4 upon shaft 14 in clockwise direction as seen in Figs. 1 and 2. With the ramp so elevated, the bed and ramp form a rigid structure for traveling purposes and particularly when the ramp 4 is hitched and resting upon the fifth wheel 6 of the tractor 7. When the trailer is disconnected from the towing vehicle and propped up by means of the blocks 46, the ramp can be lowered in counterclockwise fashion as shown in Fig. 3, swinging upon the pivotal shaft 14 with the saddles 42 to 45 moving rotationally away and out of contact with the lower projecting ends of the beams 15 to 18 of the bed 1. Pins 41 may be used in Fig. 2 to hold the ramp 4 elevated but such pins must be removed to swing the ramp 4.

The sets of baffles 29—30, 31—32, etc., through their rigid connections with the ramp framework, and by the connecting saddles described, provide stabilizing means for the ramp in that the sets each straddle the projecting beams of the bed framework, respectively. The lift of the ramp is confined to a true vertical movement, and no side sway results between the connected ramp and bed parts or in the ramp per se by using the baffles described arranged in the manner shown with each set of baffles in contact with the opposite side edges of each beam or channel of the bed adjacent the pivotal connection of ramp 4 with bed 1. This same constructional feature applies with equal efficiency and results in the ramp structure illustrated in Fig. 6 and hereinafter to be described.

As best seen in Figs. 2 and 3, the planking 10 of the ramp 4 terminates close to the supporting shaft 14 and is arranged to remain near to the end of the bed planking 8 by reason of the short radius of motion of the ramp planking 10 at this point adjacent to the shaft 14. The gap between plankings 8 and 10 is easily spanned by the machinery being loaded, and as seen in Fig. 3, the slight hump 47 of the ramp 4 which remains above the general plane of the loading bed 1 will in this case act to safeguard the terminal planks of the planking 8 and 10 adjacent to the shaft 14 by reason of caterpillar mechanisms or other wheeled means of the loading machinery normally bridging the plank gap at 48 as the machinery assumes a loading position as diagrammatically illustrated by the broken line 49 in Fig. 3.

A different loading situation is established by means of the ramp shown in Fig. 6 which has a different contour without change in size or clearances from the ramp shown in Fig. 2, the chief change residing in a pivotal arrangement that places the swingable ramp axis in a more remote position from the outer adjacent end of the bed of the trailer.

In Fig. 6, the bed 1 is substantially the same in all respects, having planking 8 terminating at 50 with the bed framework beams projecting at 51 but with the last cross beam 19a being located as shown. The ramp 52 has the same forward outer end design as in the ramp 4 but the baffles that flank the ramp beams each have a rearwardly extending arm 53 adapted for pivotal connection with bed 1 upon a cross shaft 54 remotely carried by the bed with respect to the terminal forward end 55 thereof. The baffles each include a curved rear edge 56 made concentric with the axis of shaft 54 to properly clear the edge 50 of the planking 8 when the ramp 52 is raised and lowered. Saddles 57 are connected to the lower ends of the baffles to function-like saddles 42 to 45. With each of the sets of baffles flanking the projecting bed beams, the ramp is adequately stabilized to prevent relative side sway between the ramp and the bed.

With this arrangement the vertical sections 58 of each of the baffles are farther from the axis of support of the ramp 52 so less operative movement is needed for this portion of the ramp 52 in contrast with ramp 4, whereby the surface contour of the baffles and ramp frame permit the use of a greater radius curve at 59 between the outer straight portion 60 of the ramp and the trailing straight portion 61 all of which portions are covered with planking 62. The change in surface contour allows a smooth runway as seen by the line of the planking 62 and the latter terminates at 63 in line with the planking 8 of the bed 1 with no portion of the ramp planking 62 disposed above the general plane of the bed planking 8 when the ramp 52 is lowered as seen in Fig. 6.

This ramp 52 also permits an additional constructional feature which comprises the use of a transverse plate 64 secured to the ramp framework or baffles, such plate having the function of limiting the downward motion of the ramp by coming to rest upon the upper surfaces of the projecting bed beams 51. The rearward intermediate portion of the ramp 62 can in this way be supported upon the supported end of the bed with the ground contacting end 65 of the ramp 52 resting upon the ground, which arrangement will relieve the strain transmitted to the arms 53 and shaft 54 during loading operations.

Ramp 52 when in the traveling position shown in broken lines in Fig. 6, supports the trailer bed by the saddles 57, and since the swingable ramp axis of shaft 54 is a greater distance from the saddle-beam contact point in this modified construction than in the first form described, less strain and abuse is transmitted to the shaft 54 by vertical forces at the hitch pin 66 during hauling position, or by vertical forces upon the trailer bed through the ramp parts to the reaction point at pin 66 of the ramp, whichever phase may be considered in regard to the shearing stresses encountered at shaft 54.

Either ramp has its inherent qualities in carrying out its purpose of loading a trailer and in providing hitch means to tow the trailer. Both ramps provide unitary swingable structures operating on single pivotal axes and supply simple and efficient means for carrying out the objects of the present invention.

Since the disclosures are only illustrative in character they are not to be considered as limiting the design of the ramps described. Changes and modifications in the structures presented are contemplated without departing from the fundamental concept of the invention and the extent of such changes shall be determined by the breadth and scope of the appended claims.

What I claim is:

1. In a trailer, a machinery hauling bed, a load supporting covering upon said bed, a rigid unitary ramp for said bed, a load suporting covering carried by said rigid ramp, the covering on said ramp being substantially equal in width to the covering upon said bed to provide a wheel supporting roadway for wheeled vehicles, and a single pivotal member on said bed to suport the unitary ramp for bodily swinging the entire ramp between a raised traveling position and machinery loading position about a fixed axis on said bed and to dispose said coverings in contiguous relation with respect to each other.

2. In a trailer, a machinery hauling bed, a load supporting covering upon said bed, a rigid unitary ramp for said bed, a load supporting covering carried by said rigid ramp, the covering on said ramp being substantially equal in width to the covering upon said bed to provide a wheel supporting roadway for wheeled vehicles, and a single pivotal member on said bed to support the unitary ramp for bodily swinging the entire ramp between a raised traveling position and machinery loading position about a fixed axis on said bed and to dispose said coverings in contiguous relation with respect to each other, said ramp having fifth wheel hitch means connected therewith for operative towing connection with a pulling vehicle when said ramp is disposed in raised traveling position.

3. In a trailer, a machinery hauling bed, a load supporting covering upon said bed, a ramp for said bed, a load supporting covering carried by said ramp, the covering on said ramp being substantially equal in width to the covering upon said bed, and pivotal means for bodily swinging the entire ramp between a raised traveling position and machinery loading position about a fixed axis on said bed, said bed covering being arranged to terminate close to the axis of said pivotal means and said ramp covering also terminating close to said axis, whereby relative movement between said ramp and the bed for loading causes only slight separation between the bed and ramp coverings adjacent said pivotal means.

4. In a trailer, a machinery hauling bed, a ramp, load supporting coverings on said bed and ramp respectively, transverse pivotal means carried by said bed and connected with said ramp for bodily swinging the latter with respect to said bed, said coverings terminating in spaced relation with respect to each other adjacent said pivotal means, and said ramp having a load carrying hump thereon arranged to extend above the plane of the bed covering when the ramp is in loading position to cause machinery being loaded to protectively bridge the gap between the adjacent terminal portions of the bed and ramp coverings.

5. In a machinery hauling trailer, a bed, a completely rigid and unitary ramp, a pivot member on said bed, said rigid ramp having direct connection with said pivot member for bodily swinging movement relative to said bed and about the axis of said pivot member, said completely rigid ramp comprising a forwardly extended section, and a rearwardly and downwardly extending section to connect said first section with said pivot member to swing said first section bodily about the axis of said pivot member, both ramp sections having contiguous load supporting coverings secured thereto, and said bed having a load supporting covering secured thereto and arranged to form a continuation of the ramp covering to receive or discharge machinery over said ramp when the latter is swung into contact with the ground.

6. In a machinery hauling trailer, a bed, a ramp, a pivot member on said bed, said ramp having connection with said pivot member for bodily swinging movement relative to said bed and about said pivot member, said ramp comprising a forwardly extended section, and a rearwardly and downwardly extending section to connect said first section with said pivot member, both ramp sections having contiguous load supporting coverings secured thereto, and said bed having a load supporting covering secured thereto and arranged to form a continuation of the ramp covering to receive or discharge machinery over said ramp when the latter is swung into contact with the ground, said ramp having stop means thereon to limit the upward swinging movement thereof and to support the adjacent end of the bed therethrough, and said ramp having other stop means thereon to limit the downward swinging movement thereof with respect to said bed and to bring the bed end of the ramp to rest upon the bed when the outer end of the ramp is resting upon the ground.

7. In a machinery hauling trailer, a bed, a ramp, and operable means carried by said bed remote from the end thereof for connection with said ramp to bodily swing the latter about a point on said bed, said ramp comprising a forwardly projecting section, and a rearwardly and downwardly projecting section, both of the aforesaid sections having load supporting coverings thereon, and said ramp having rearwardly projecting arms thereon for connection with said remote operable means on said bed, said remote position of said operable means functioning to reduce the arc of swing of the bed end of the ramp, and load supporting covering secured to said bed and arranged to form an aligned continuation of the load supporting coverings of said ramp when the latter is swung into loading position.

8. In combination in a trailer, a bed, and a loading ramp therefor, pivotal means on said bed and connected with said ramp to bodily swing the latter with respect to said bed between traveling and machinery loading positions, flooring on said bed terminating in spaced relation to the end of the bed, and flooring on said ramp to provide a machinery runway, said ramp when lowered to the ground about said piovtal means being adapted to bring said ramp flooring into continuous coactive relation to said bed flooring, with a portion of said ramp flooring forming a continued part of the bed flooring terminating short of the bed end, and the remaining portion of the ramp flooring extending over the ramp to the ground.

9. In combination in a trailer, a bed, and a loading ramp therefor, pivotal means on said bed and connected with said ramp to bodily swing the latter with respect to said bed between traveling and machinery loading positions, flooring on said bed terminating in spaced relation to the end of the bed, and flooring on said ramp to provide a machinery runway, said ramp when lowered to the ground about said piovtal means being adapted to bring said ramp flooring into continuous coactive relation to said bed flooring, with a portion of said ramp flooring forming a continued part of the bed flooring terminating short of the bed end, and the remaining portion of the ramp flooring extending over the ramp to the ground, said pivotal means being located remotely from the end of the bed and rearwardly of the terminal end of the bed flooring, and said ramp including rearward extensions thereon to connect with said pivotal means to reduce the actual vertical swing of the bed cooperating part of the ramp flooring through its arc of operation about the pivotal means.

10. In a trailer, a wheel supported machinery hauling bed, a rigid unitary ramp having hitch means connected therewith for connection with a towing vehicle and for hauling said bed, said ramp being of full bed width to provide a roadway to said bed for wheeled vehicles, a single pivotal member on said bed to support the unitary ramp for bodily swinging the entire ramp between hitching position and machinery loading position about a fixed axis on said bed, and stop means carried by said ramp for contact with said bed to limit the upward movement of the ramp about said single pivotal member and to support said bed through said ramp when the hitch means of said ramp is connected with a towing vehicle.

11. In a trailer, a wheel supported machinery hauling bed, a hitch unit connected with said bed and having hitch means thereon for attachment with a towing vehicle for the transport of said wheel supported bed, said hitch unit comprising a rigid unitary ramp to provide a roadway to said bed for loading vehicles when said ramp is disposed in engagement with the ground, and a single pivotal member on said bed connected with said unitary ramp to support said ramp for bodily swinging movement between raised hitching and lowered loading positions respectively about said single pivotal member of said bed.

12. In a trailer, a wheel supported machinery hauling bed, a hitch unit connected with said bed comprising an upright section disposed adjacent the head end of said bed and extending above the latter for connection with a horizontally disposed towing section whereby to haul said bed, said joined upright and towing sections together presenting continuous surfaces of curved and straight portions comprising a rigid unitary ramp to provide a runway for loading vehicles upon said bed when said ramp is disposed in engagement with the surface of the road, and pivotal means carried by said bed and connected with said upright section of said ramp about which to bodily swing said ramp with respect to said bed, said pivotal means comprising a single pivotal member traversing said bed and the upright section of said hitch unit.

13. In a trailer, a wheel supported machinery hauling bed, a rigid unitary ramp having hitch means connected therewith for connection with a towing vehicle and for hauling said bed, said ramp being of full bed width to provide a roadway to said bed for wheeled vehicles, a single pivotal member on said bed to support the unitary ramp for bodily swinging the entire ramp between hitching position and machinery loading position about a fixed axis on said bed, and stop means carried by said ramp for contact with said bed to limit the upward movement of the ramp about said single pivotal member and to support said bed through said ramp when the hitch means of said ramp is connected with a towing vehicle, said bed having forwardly extended parts, said ramp having vertically arranged parts positioned to straddle and to overlap said extended bed parts, and saddle members connected with said ramp parts to bodily engage and abut the underside of said bed parts as said ramp is raised into hitching position.

WILLIAM E. MARTIN.

References Cited in the file of this patent

UNITED STATES PATENTS

| Number | Name | Date |
|---|---|---|
| 2,131,949 | Helmig | Oct. 4, 1938 |
| 2,173,277 | Jarmin et al. | Sept. 19, 1939 |
| 2,431,436 | Townsend | Nov. 25, 1947 |
| 2,441,710 | Martin | May 18, 1948 |
| 2,443,611 | Ferguson | June 22, 1948 |
| 2,449,947 | Meadows | Sept. 21, 1948 |
| 2,452,789 | Pike | Nov. 2, 1948 |
| 2,530,866 | Evans et al. | Nov. 21, 1950 |